(No Model.)
J. W. STILLWELL.
APPARATUS FOR DRAWING LUMBER FROM THE CRIB.
No. 256,511. Patented Apr. 18, 1882.
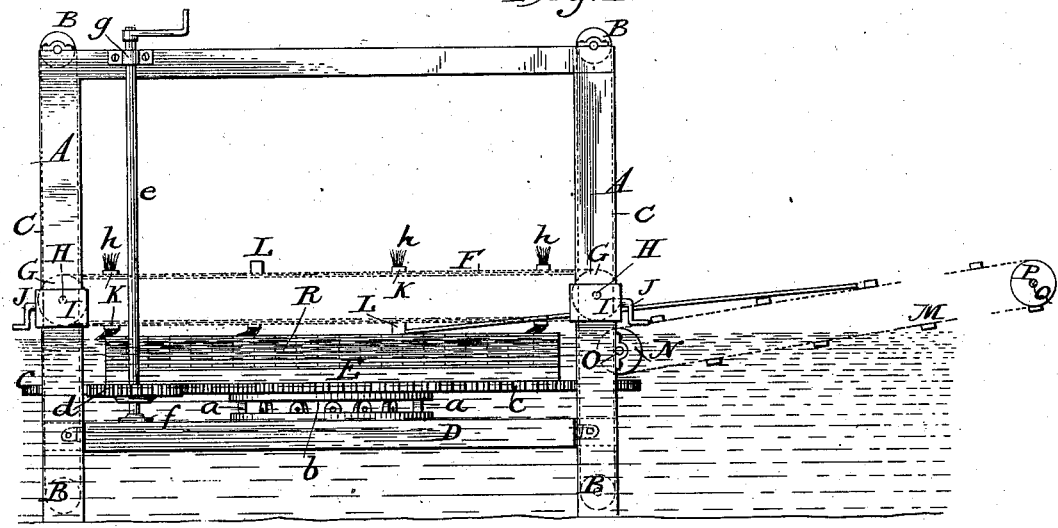
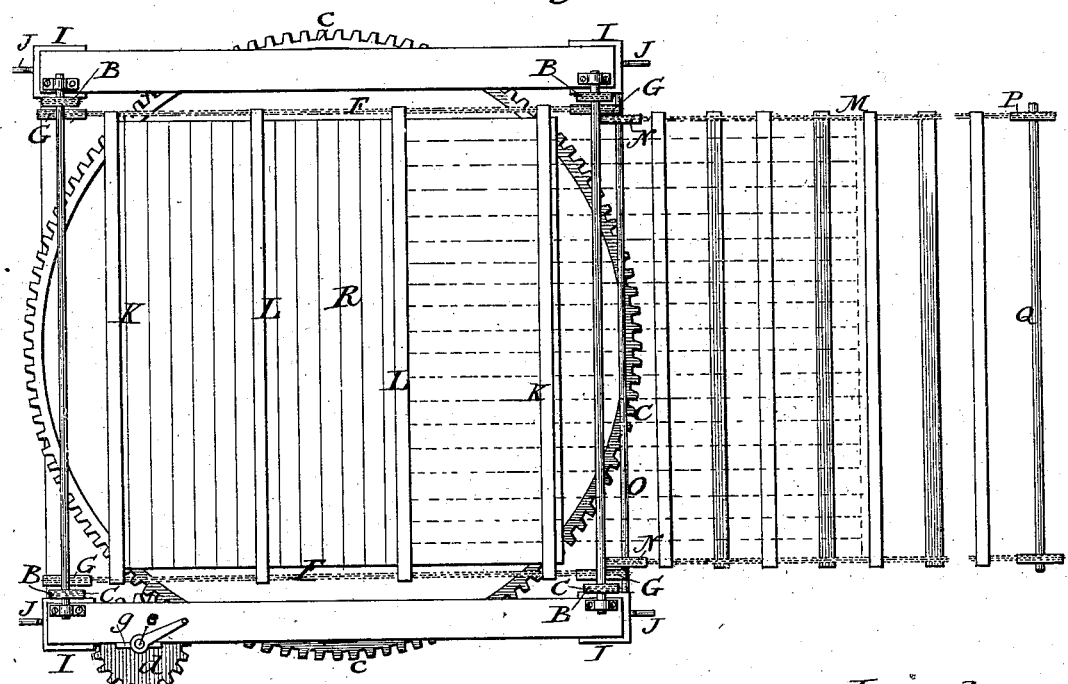

UNITED STATES PATENT OFFICE.

JAMES W. STILLWELL, OF HANNIBAL, MISSOURI.

APPARATUS FOR DRAWING LUMBER FROM THE CRIB.

SPECIFICATION forming part of Letters Patent No. 256,511, dated April 18, 1882.

Application filed March 3, 1882. (No model.)

*To all whom it may concern:*

Be it known that I, JAMES W. STILLWELL, of Hannibal, in the county of Marion and State of Missouri, have invented certain Improvements in Apparatus for Unloading Lumber, of which the following is a specification.

My invention relates to apparatus for loading and unloading lumber; and it consists in a turn-table mounted upon a vertically-adjustable bed and adapted to receive the lumber which is floated or placed thereon in the form of a crib, with the boards of successive layers laid at right angles, the turn-table serving to present the ends of boards of successive layers to the carriers which remove the boards therefrom.

The invention further consists in an endless-chain carrier provided with brushes to sweep or clean the boards and with slats or cross-pieces to engage the ends of the boards and move them forward, and in other details hereinafter explained.

In the accompanying drawings, Figure 1 represents a side elevation of my improved apparatus, and Fig. 2 a plan view of the same.

The apparatus is especially designed for unloading lumber from cribs and transferring the same from the water to the shore; and to this end it consists of a rectangular frame built in the water close to shore, the corner-posts A of which are provided at their upper and lower ends with chain sheaves or pulleys B, around which are passed endless chains C, carrying a bed or platform, D, which may be raised or lowered, as desired, by operating the chains.

Upon the bed or platform D is mounted a turn-table, E, of any suitable or usual construction, supported by and turning upon rollers *a*, traveling upon a circular track, *b*.

The turn-table is furnished with a circular or segmental rack, *c*, with which a pinion, *d*, meshes, by which the table is turned or rotated about its center, the pinion being fixed upon a shaft, *e*, the lower end of which is carried in a step or bearing, *f*, while the upper end passes through and slides in a box or guide, *g*, to permit the rise and fall of the shaft with the platform and turn-table.

F F represent horizontal endless chains carried about sheaves or pulleys G, which are mounted upon cross-shafts H, extending between the side posts of the frame, and carried at their ends in vertically-adjustable blocks or boxes I, which slide upon the posts A of the frame, and are held at any desired height by set-screws J, as indicated. The chains F carry a series of cross bars or slats, K, armed with brushes *h*, which travel over and sweep the boards, and also with rigid cross-slats L, which are not provided with brushes, but serve to engage the ends of the boards and to move them forward.

M represents a second endless-chain carrier, passing about pulleys N, carried by a shaft, O, located just below the pulleys G, and around a second set of pulleys, P, carried by a shaft, Q, mounted in suitable supports at the point where the boards are to be delivered.

Motion may be imparted to either of the shafts H and to the shaft O or Q by hand-power, or by any convenient motor.

The apparatus being thus constructed and arranged, the operation is as follows: The bed or platform is let down sufficiently low to permit the crib R to be floated upon the turn-table E. The chain-carriers F and M are then set in motion, and the bed or platform is raised until the boards are swept by the brushes *h*. After the brushes pass over the boards and sweep their surface clean the slats L engage their ends, and carrying an entire tier or layer of the boards before them, as in Fig. 1, deposit them upon the carrier M, by which they are delivered at the desired point. When a layer has been thus removed the turn-table is given a quarter-turn by the pinion *d* to bring the ends of the boards of the next tier or layer in position to be engaged by the slat or cross-bar L, and these operations are repeated until all the boards are removed, the bed and turn-table being raised by the chains C from time to time, as required, to permit the carrier F to properly act upon the boards. In this way the boards are well cleaned and rapidly carried to the desired point on shore without the necessity of being handled.

Any suitable means for operating and locking the chains C for raising platform D and holding it in place may be provided; but the same result may be accomplished by taking hold of the chains themselves, the platform and crib being so nearly floated or sustained by the water that no special means of holding up the bed are ordinarily required.

Having thus described my invention, what I claim is—

1. An apparatus for unloading lumber, consisting of a vertically-adjustable turn-table placed in the water in which the lumber is floated, and a carrier located above the turn-table and adapted and arranged to remove the boards therefrom, as explained.

2. In combination with the turn-table E, the endless carrier F, provided with slats L and brushes h, as and for the purpose set forth.

3. In combination with the carrier F, a turn-table, E, and bed or platform D, and chains or bands C, connected with the platform and adapted to elevate or lower the turn-table, as explained.

4. In combination with the turn-table E, the vertically-adjustable carrier F, as and for the purpose set forth.

5. A lumber feeding or carrying device provided with brushes h and cross-slats L, substantially as and for the purpose set forth.

6. In combination with the frame A and vertically-adjustable turn-table E, the carrier F and adjustable supporting-blocks I, provided with set-screws J, as shown.

7. In combination with the vertically-adjustable turn-table having rack c, the pinion d, carried by a sliding shaft, e, as set forth.

8. In combination with turn-table E and carrier G, the endless carrier M, arranged and operating as shown and described.

JAMES W. STILLWELL.

Witnesses:
MATT N. PRIEST,
WALTER D. ANDERSON.